(12) United States Patent
Das

(10) Patent No.: US 11,443,186 B2
(45) Date of Patent: Sep. 13, 2022

(54) METHOD AND SYSTEM FOR EXECUTING PROCESSES IN OPERATING SYSTEMS

(71) Applicant: Wipro Limited, Bangalore (IN)

(72) Inventor: Rishav Das, Howrah (IN)

(73) Assignee: Wipro Limited, Bangalore (IN)

(*) Notice: Subject to any disclaimer, the term of this patent is extended or adjusted under 35 U.S.C. 154(b) by 497 days.

(21) Appl. No.: 16/701,419

(22) Filed: Dec. 3, 2019

(65) Prior Publication Data

US 2021/0103809 A1    Apr. 8, 2021

(30) Foreign Application Priority Data

Oct. 3, 2019 (IN) .............................. 201941040056

(51) Int. Cl.
| | |
|---|---|
| *G06N 3/08* | (2006.01) |
| *G06F 9/48* | (2006.01) |
| *G06F 16/9035* | (2019.01) |
| *G06K 9/62* | (2022.01) |
| *G06F 16/901* | (2019.01) |
| *G06F 9/38* | (2018.01) |

(52) U.S. Cl.
CPC ............. *G06N 3/08* (2013.01); *G06F 9/3891* (2013.01); *G06F 9/4881* (2013.01); *G06F 16/9027* (2019.01); *G06F 16/9035* (2019.01); *G06K 9/6218* (2013.01)

(58) Field of Classification Search
CPC ... G06N 3/08; G06F 16/9035; G06F 16/9027; G06F 9/4881; G06F 9/3891; G06K 9/6218
USPC ......................................................... 706/25
See application file for complete search history.

(56) References Cited

U.S. PATENT DOCUMENTS

| | | | |
|---|---|---|---|
| 5,692,192 A | 11/1997 | Sudo | |
| 11,176,489 B1 * | 11/2021 | Smola | ...................... G06N 3/08 |
| 2004/0083326 A1 | 4/2004 | Wang et al. | |

(Continued)

FOREIGN PATENT DOCUMENTS

CN        103676003 A1    3/2014

OTHER PUBLICATIONS

Xiao, Wencong, et al., "Gandiva: Introspective Cluster Scheduling for Deep Learning", OSDI '18, Carlsbad, CA, Oct. 8-10, 2018, pp. 595-610.*

(Continued)

*Primary Examiner* — Robert Stevens
(74) *Attorney, Agent, or Firm* — Finnegan, Henderson, Farabow, Garrett & Dunner, LLP

(57) ABSTRACT

A method and system for executing processes in an operating system is disclosed. The method may include assigning a tag Identifier (ID) and a first tree ID to each of a plurality of processes based on associated at least one attribute. The method may further include determining content patterns associated with each of the plurality of processes using a deep learning network. The method may include assigning a second tree ID to each of at least one process from the plurality of processes based on the identified content pattern. The method may further include generating a set of clusters for the plurality of processes based on the second tree ID assigned to each of the at least one process. The method may include executing each process within a cluster from the set of clusters based on execution of a single process within the cluster.

20 Claims, 8 Drawing Sheets

(56) References Cited

U.S. PATENT DOCUMENTS

| | | | |
|---|---|---|---|
| 2018/0113742 A1 | 4/2018 | Chung et al. | |
| 2019/0332422 A1* | 10/2019 | Liu | G06F 9/4881 |
| 2020/0193268 A1* | 6/2020 | Blagodurov | G06N 3/0454 |

OTHER PUBLICATIONS

Zhang, Ke, et al., "Automated IT System Failure Prediction: A Deep Learning Approach", BigData 2016, Washington, DC, USA, Dec. 5-8, 2016, pp. 1291-1300.*

"Deep Learning", Wikipedia, downloaded from: en.wikipedia.org/wiki/Deep_learning, Jun. 2, 2022, pp. 1-26.*

\* cited by examiner

| Process ID | Assigned Tag ID |
|---|---|
| 127726 | WRT-TAG |
| 127727 | WRT-TAG |
| 188734 | RAD-TAG |
| 188735 | COM-TAG |

| Process ID | Assigned Tag ID | Assigned Tree-ID |
|---|---|---|
| 127726 | WRT-TAG | ISD-5673 |
| 127727 | WRT-TAG | PSD-9864 |
| 188734 | RAD-TAG | ISD-8743 |
| 188735 | COM-TAG | ISD-5523 |
| 188736 | WRT-TAG | IFD-9813 |

FIG. 4A

| Tree ID 418 | Blocks 420 | Cluster Name 422 | Chunk Size 424 | Sequence-ID 426 |
|---|---|---|---|---|
| ISD-5673 | VM-8733 | CLS763 | 4KB | SQ-PSD |
| PSD-9864 | VM-8734 | CLS764 | 4KB | SQ-ISD |
| ISD-8743 | VM-8735 | CLS763 | 4KB | SQ-ISD |
| ISD-5523 | VM-8800 | CLS763 | 4KB | SQ-ISD |
| IFD-9813 | VM-8801 | CLS765 | 4KB | NULL |

METHOD AND SYSTEM FOR EXECUTING PROCESSES IN OPERATING SYSTEMS

TECHNICAL FIELD

This disclosure relates generally to operating systems and more particularly to method and system for executing processes in operating systems.

BACKGROUND

With advancement of application oriented hardware systems, the interface mechanism (Operating System) between a user and the hardware has been disrupted. An existing interface mechanism uses kernel-shell as an interpreter between the user and the hardware system. The major problem with this kind of mechanism is that process execution is a sequential process. Thus, the time distribution is dependent on every process which is scheduled in the operating system. In a scenario, if processes execute in a round robin manner (i.e., sequential method), there is a bandwidth requirement for time of execution. Also, it does not matter whether half execution will result in interruption of the whole process. This may in turn interrupt the application of process. Thus, there is a problem of the time-based execution and sequential execution.

One of the conventional methods that solves the above problem is a hardware based mechanism in which an extra core is involved to solve half executed processes. However, this leads to an increase in the cost as well as the Time To Resolve (TTR). There may be different set of algorithm that may be used for scheduling the policy of execution. But, the major problem of scheduling algorithms is that they are static in nature, i.e., they are fixed as developed by the Original Equipment Manufacturer (OEM). These algorithms do not have the intelligence to align the policy based on the queue depth and other external parameter. Hence utilization of policy does not work properly and does not operate itself, as it does not work based on circumstances, but based on its static predefined method.

Hence, the existing algorithms are widely used for scheduling processes in the processor using kernel. These algorithms only play with the time of execution but does not consider the content within these processes. For example, if there are three cores, three different threads may be operated in parallel and sequential ordering. For a single core or a dual core, it can compute in parallel for two processes and rest arrangements can be sequential. This needs to be held in a queue and may only be executed once the current execution is completed. Alternatively, these processes may be parked aside within a given threshold of execution. This is again stored in the memory and a huge amount of latency occurs for the application as well as for process scheduling of the operating system. This problem is a pain area for cloud based computation. This problem may be solved by increasing the hardware bandwidth, which is again limited and because of this reason, processor cores have been increased sequentially over the years. This however acts as a limitation for Internet of Things (IoT) based devices, where computation needs to be faster and portability of an IoT device limits implantation of huge computing systems. In order to make a portable device faster, there is no solution to optimize mechanism of scheduling processes in the operating system.

SUMMARY

In one embodiment, a method for executing processes in an operating system is disclosed. The method may include assigning, by a scheduling device, a tag Identifier (ID) and a first tree ID to each of a plurality of processes based on associated at least one attribute. The method may further include determining, by the scheduling device, content pattern associated with each of the plurality of processes using a deep learning network. The method may include assigning, by the scheduling device, a second tree ID to each of at least one process from the plurality of processes based on the identified content pattern. The method may further include generating, by the scheduling device, a set of clusters for the plurality of processes based on the second tree ID assigned to each of the at least one process. The method may include executing, by the scheduling device, each process within a cluster from the set of clusters based on execution of a single process within the cluster.

In another embodiment, a system for executing processes in an operating system is disclosed. The system includes a processor and a memory communicatively coupled to the processor, wherein the memory stores processor instructions, which, on execution, causes the processor to assign a tag ID and a first tree ID to each of a plurality of processes based on associated at least one attribute. The processor instructions further cause the processor to determine content pattern associated with each of the plurality of processes using a deep learning network. The processor instructions cause the processor to assign a second tree ID to each of at least one process from the plurality of processes based on the identified content pattern. The processor instructions further cause the processor to generate a set of clusters for the plurality of processes based on the second tree ID assigned to each of the at least one process. The processor instructions cause the processor to execute each process within a cluster from the set of clusters based on execution of a single process within the cluster.

In yet another embodiment, a non-transitory computer-readable storage medium is disclosed. The non-transitory computer-readable storage medium has instructions stored thereon, a set of computer-executable instructions causing a computer that includes one or more processors to perform steps of assigning a tag ID and a first tree ID to each of a plurality of processes based on associated at least one attribute; determining content pattern associated with each of the plurality of processes using a deep learning network; assigning a second tree ID to each of at least one process from the plurality of processes based on the identified content pattern; generating a set of clusters for the plurality of processes based on the second tree ID assigned to each of the at least one process; and executing each process within a cluster from the set of clusters based on execution of a single process within the cluster.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A and 4B illustrate tables depicting allocation of tag identifiers, tree identifiers, and process clustering for a plurality of processes, in accordance with an exemplary embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
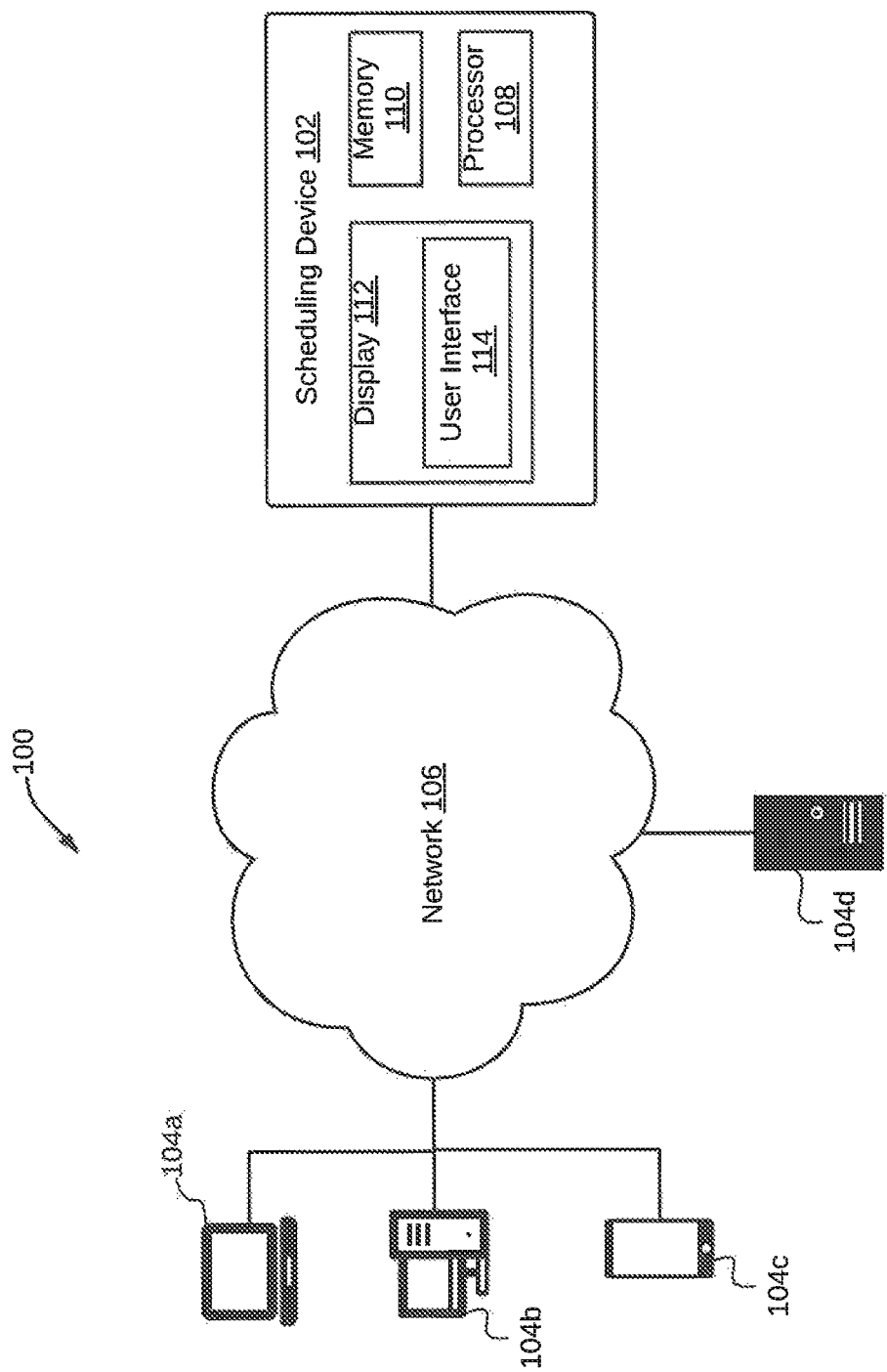
FIG. 1 is a block diagram illustrating a system for executing processes in operating system, in accordance with an embodiment.

Referring now to FIG. 1, is a block diagram illustrating a system 100 for executing processes in an operating system is illustrated, in accordance with an embodiment. The system 100 may include a scheduling device 102 that may be configured to execute a plurality of processes in an operating system. The scheduling device 102 may further be configured to schedule each of the plurality of processes for execution in the operating system. The system 100 may reduce the latency in scheduling and execution of the plurality of processes in the operating system.

The scheduling device 102 may further be in communication with a plurality of computing device 104 (for example, a laptop 104a, a desktop 104b, and a smart phone 104c). Other examples of the plurality of computing devices 104 may include, but are not limited to a server 104d (for example, an application server). The plurality of computing devices 104 may be communicatively coupled to the scheduling device 102 via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

One or more of the plurality of processes to be executed in the operating system may be received from one or more applications installed on one or more of the plurality of computing devices 104 or within the scheduling device 102. In order to execute and schedule the plurality of processes, the scheduling device 102 may include a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access Memory (SRAM). The memory 110 may further include various modules that enable the scheduling device 102 to schedule and execute the plurality of processes. These modules are explained in detail in conjunction with FIG. 2. The scheduling device 102 may further include a display 112 having a User Interface (UI) 114 that may be used by a user to provide inputs to the scheduling device 102.

Figure 2:
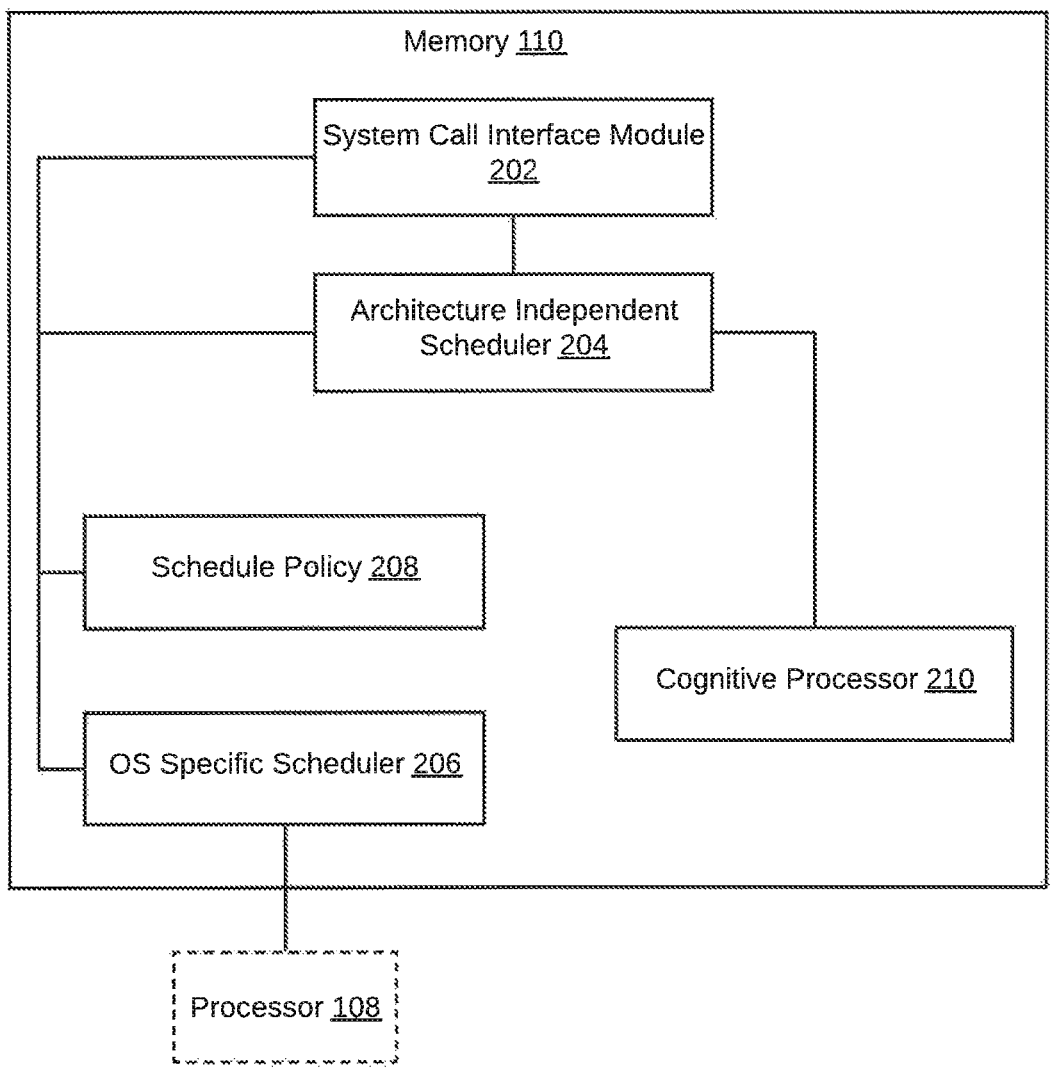
FIG. 2 is a block diagram illustrating various modules within a memory of a scheduling device configured to execute processes in an operating system, in accordance with an embodiment.

Referring now to FIG. 2, a block diagram of various modules within the memory 110 of the scheduling device 102 configured to execute processes in an operating system is illustrated, in accordance with an embodiment. The memory 110 includes a system call interface module 202, an architecture independent scheduler 204, an Operating System (OS) specific scheduler 206, a schedule policy 208, and a cognitive processor 210.

The system call interface module 202 receives and interprets one or more system calls within the operating system. When Input Output Per Second (TOPS) requests are made by a computing device, the system call interface module 202 receives a group of processes or a single process. For a complex environment, a process may be dependent on other processes, which may be carried out by inter process communication standard protocols. The process may include one or more system calls as programmed in an application. The one or more system calls may be exfoliated part of a single process. The system call interface module 202 may understand a process and may further break down the process into child process, or fork processes, based on relativity of the process. The relativity, for example, may include parent and child processes, which are linked with each other. The system call interface module 202 may also arrange the processes (or system calls) based on the schedule policy 208. This is further explained in detail in conjunction with FIG. 3.

The architecture independent scheduler 204 is the main scheduler of processes as provided by system calls. A system call may include the hierarchy and variables of the process which are stored and divided into sub processes. Based on the hierarchy, the architecture independent scheduler 204 may be common in any architecture irrespective of a Central Processing Unit (CPU) design. The architecture independent scheduler 204 may be responsible for communicating with a file system (not shown in FIG. 2) and an additional memory (not shown in FIG. 2) during execution of processes. These processes may be handled by the system calls through a real time embedded system architecture, in the absence of a conventional CPU.

The architecture independent scheduler 204 may help other specific schedulers to integrate with identical processor designs and may accordingly manipulate a process. Further, the architecture independent scheduler 204 may integrate with external peripheral devices using Inter Process Communication (IPC) and the network 106 for syncing with other systems or devices. Various interfaces established by connection protocols (wired or wireless) used for communicating with external peripheral devices may include, but are not limited to a Serial Advanced Technology Attachment (SATA), an Integrated Drive Electronics (IDE), IEEE-1394, Universal Serial Bus (USB), fiber channel, Small Computer Systems Interface (SCSI), STD Bus, RS-232, RS-422, RS-485, I2C, SPI, Microwire, 1-Wire, IEEE 1284, Intel QuickPathInterconnect, InfiniBand, Peripheral Component Interconnect Express (PCIe).

The OS specific scheduler 206 integrates with a CPU, (for example, the processor 108) as the components and configuration of the CPU varies widely based on the complexity of a content pattern within a process. The OS specific scheduler 206 may have to interpret and exchange variables based on the architecture independent scheduler 204 and the CPU, for execution of processes identified based on the content pattern. The OS specific scheduler 206 runs based on policy within the schedule policy 208. The policy may need to be defined by a policy manager and the policy may be one or more algorithms that may reside in the OS specific scheduler 206. Using these algorithms, the architecture independent scheduler 204 may schedule any process in the CPU, via, the OS specific scheduler 206. Further, the schedule policy 208 may provide independent policy for an end user administration. The schedule policy 208 may include Round Robin (RR), First-Come First-Served (FCFS), Pre-emptive FCFS, or priority based scheduling etc. The schedule policy 208 may be used based on the queue state and method of operation as decided by the cognitive processor 210. Functionality of the OS specific scheduler 206 is further explained in detail in conjunction with FIG. 3.

The cognitive processor 210 is the core component of the scheduling device 102. The main content processing and process scheduling depends on the decision provided to the architecture independent scheduler 204 in order to speed out its integration. A process may get exfoliated and stored in a queue by the system call interface module 202. Every process is provided with a tree ID that needs to be labeled by the cognitive processor 210 based on availability and presence of a content pattern. The cognitive processor 210 may determine whether a process is listed or waiting in the queue based on the associated content pattern. If content pattern of the process is similar to the current process under execution, then the process may get appended with the current process. The content pattern within the processes may be parsed and may be determined from the tree ID and a type of operation the process has to perform.

A tree ID may also be used to determine the sequence of process that has to be operated and performed. The sequence helps to align sub-processes which needs to be aligned one after the other. Moreover, the execution patterns are also determined from the tree ID. All the processes that include same or similar content patterns are labeled to be categorized under the same cluster while execution. There may be multiple processors which may be scheduled by the architecture independent scheduler 204 based on execution pattern of clusters. The cognitive processor 210 may take input as a specific function, such as, an addition operation, a logical operation, an application oriented operations (for example, a functional operations of connecting the peer system, transactional IOPS operations, or BUS and control line operation).

The functions may be detected based on an associated tree-ID, where the decision and functions reside. Thus, every time, the same operator is not required to be called for a different set of processes. All the processes within the similar or same cluster get operated at the same time, thereby reducing the time for information navigation in the BUS. This further reduces process communication latency by approximately 50%. This results in optimizing the scheduling of processes and reducing the latency of the operating system. Further, respective CPU cores may be assigned with a tree ID. After processes associated with a tree ID have been executed, the result of execution may be shared with the additional memory (not shown in FIG. 2). All datasets may be temporarily stored in the additional memory, while processes are being executing in the CPU.

Figure 3:
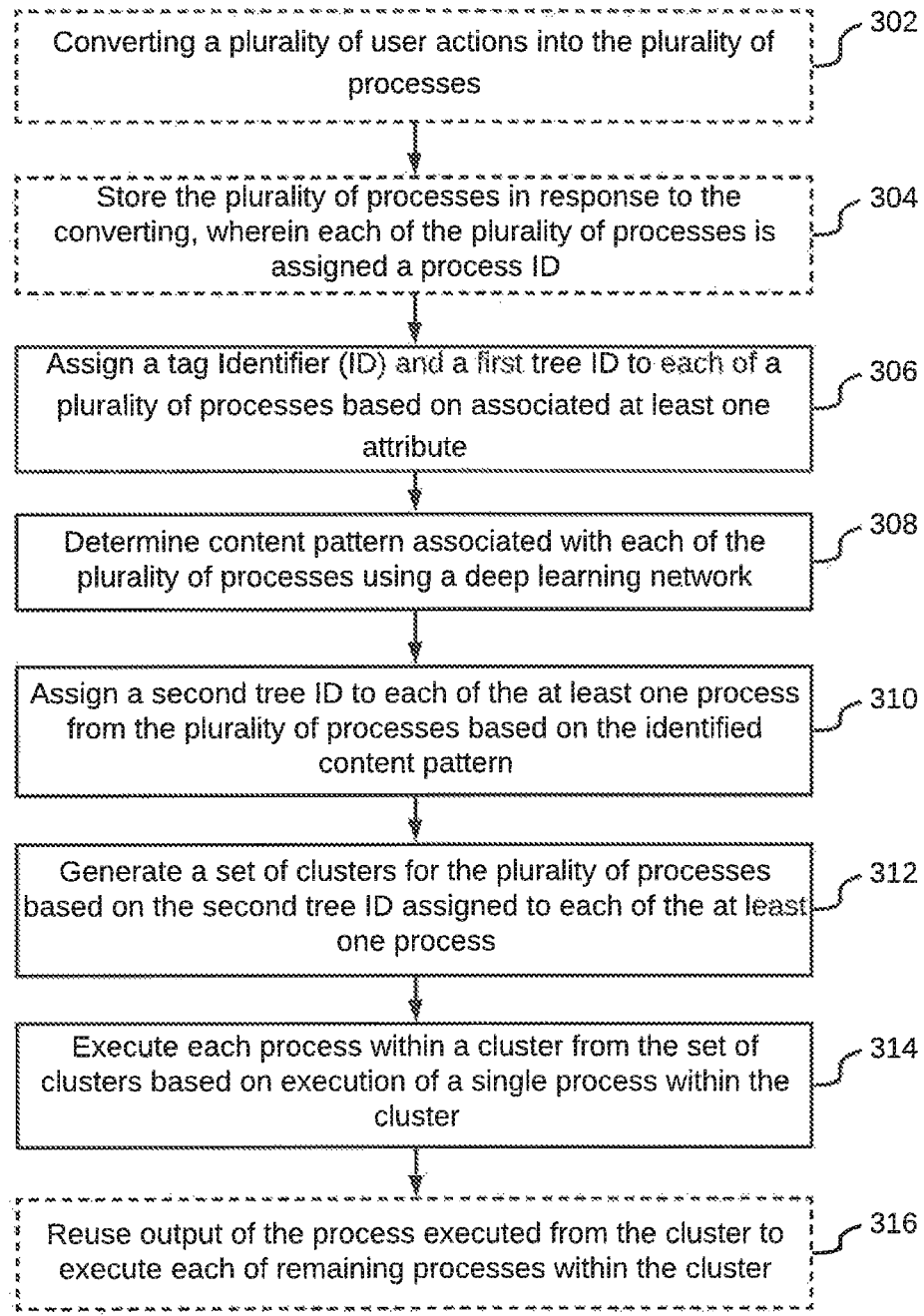
FIG. 3 illustrates a flowchart of a method for executing processes in an operating system, in accordance with an embodiment.

Referring now to FIG. 3, a flowchart of a method for executing processes in an operating system is illustrated, in accordance with an embodiment. The scheduling device 102 may receive a plurality of user actions. Examples of the user actions may include, but are not limited to accessing data, copying data, retrieving data, or initiating communication with external devices. etc. In an embodiment, whenever an application is being used by an end user, scheduling device 102 may convert an action in the application into one or more processes.

At step 302, the scheduling device 102 may convert a plurality of user actions into the plurality of processes. The plurality of user actions may be initiated at one or more of the plurality of computing devices 104. At step 304, the scheduling device 102 may store the plurality of processes in response to the converting. The scheduling device 102 may assign a process ID to each of the plurality of processes on being stored. Each of the plurality of processes may be stored in a queue. In an embodiment, the storing of the plurality of processes is not limited to a queue, and any other data storing technique may be used to store the plurality of processes. The system call interface module 202 may execute the steps 302 and 304.

At step 306, the scheduling device 102 assigns a tag Identifier (ID) to each of the plurality of processes based on associated one or more attributes. The one or more attributes associated with a process from the plurality of processes may include, but are not limited to one or more of an ID of the process, a type associated with the process, or an application associated with the process. A process type for a process may be determined by the architecture independent scheduler 204 with the help of the cognitive processor 210. The process type may be determined based on a work function of the process. For example, if a process is IOPS based process, then it will be assigned a tag ID that is relevant to an operational process. Examples of tag IDs may include, but are not limited to a WRT-TAG assigned to a write operation (operation process), a RAD-TAG assigned to a read operation (operation process), or a COM-TAG assigned to a communication process. For a process whose work function is not known, an OTR-TAG may be assigned, which may indicate other process for which there is no available tag.

In other words, a tag ID assigned to a process may define the process operation, for example, read process, write process, or an IPC process. In an exemplary embodiment, a tag ID table 402 is depicted in FIG. 4A. The tag ID table 402 includes a process ID column 404 and an assigned tag ID column 406. In the tag ID table 402, a process with ID as 127726 is assigned the WRT-TAG, a process with ID as 127727 is assigned the WRT-TAG, a process with ID as 188734 is assigned a RAD-TAG, and a process with ID as 188735 is assigned a COM-TAG. In an embodiment, based on the initial four digits of the process IDs, it may be determined whether two or more processes originate from the same application or not. By way of an example, processes with process IDs: 127726 and 127727 may originate from the same application, while the processes with process IDs 188734 and 188735 may originate from another same application.

Additionally, at step 306, the scheduling device 102 assigns a first tree ID to each of the plurality of processes. In an embodiment, the first tree-ID may be assigned based on a cluster or group of respective processes. Additionally, the content within a process may be determined and used to assign a tree ID along with the tag ID assigned to the process. The first tree ID may also be assigned to a process based on the associated one or more attributes. A tree ID defines processes which are under the same category based upon their respective content. The content of a process may include child processes, which may be used to understand different categories that may be assigned to different processes. This enables clubbing together of two or more processes. To this end, a first tree ID may be assigned to each of the plurality of processes. Moreover, by allotting the first tree ID, the hierarchy of the plurality of processes is also maintained based on the numbers allotted with the first tree ID.

In an exemplary embodiment, a tree ID table 408 is depicted in FIG. 4A. The tree ID table 408 include a process ID column 410, an assigned tag ID column 412, and an assigned tree ID column 414. The process ID column 410 includes IDs assigned to various processes, the assigned tag ID column 412 includes tag IDs assigned to various processes, and the assigned tree ID column 414 includes tree IDs assigned to various processes. In the tree ID table 408, a process with process ID 127726 is assigned the WRT-TAG as the tag ID, and ISD-5673 as the tree ID; a process ID 127727 is assigned the WRT-TAG as the tag ID, and PSD-9864 as the tree ID; a process ID 188734 is assigned the RAD-TAG as the tag ID, and ISD-8743 as the tree ID; a process ID 188735 is assigned the COM-TAG as the tag ID, and ISD-5523 as the tree ID; and a process ID 188736 is assigned the WRT-TAG as the tag ID, and IFD-9813 as the tree ID.

When two processes have same operation, however, there native applications are different and way of operations are different, these processes may be assigned different tree IDs. By way of an example and referring to the tree ID table 408, the processes with the process ID 127726 and the process ID 127727 are both assigned the WRT-TAG. However, since the native applications for these processes are different, the process ID 127726 is assigned the tree ID of ISD-5673 and the process ID 127727 is assigned the tree ID of PSD-9864. By way of another example, a process originating from a first application has a process ID 127726 and a second application has the process ID 188736. Both these processes are assigned the WRT-TAG as the tag ID, since both these processes have the same operation, that of a write request. However, the mechanism derived from these two processes for these two application is different, thus, they are assigned different tree IDs, i.e., the process with process ID 127726 is assigned the tree ID PSD-9864 and the process with process ID 127726 is assigned the tree ID IFD-9813.

At step 308, the scheduling device 102 determines content pattern associated with each of the plurality of processes using a deep learning network. The deep learning network, for example, may include a Long Term Short Memory (LSTM) Network and the LSTM network uses a tan-h activation function. The content within a process may include different set of sub-processes or child-processes that are assessed to determine relativity or associativity within the plurality of processes. In an embodiment, a process may be extracted based on the assigned tag ID. Functions for each of the plurality of processes may be identified in terms of the associated operations and functions. These operations and functions may generally be identified based on an associated linguistic form. Based on the identified linguistic form, dataset that refers to content may be learned and based on this, prediction can be made from the process queue. The dataset referring to content in a process are key factors that may be used to identify the process cluster and relativity. This is further explained in detail in conjunction with FIG. 5 and FIG. 6.

Each of the plurality of processes includes a plurality of tokens, and each of the plurality of tokens further include one or more literals. Further, in order to determine a content pattern associated with a process, the deep learning network first identifies the plurality of tokens within the process. Thereafter, the deep learning network identifies the one or more literals within each of the plurality of tokens. By way of an example, a process may include a token "A+B," where the addition operation, i.e., "+" is a literal and "A+B" forms a content pattern. Additionally, the process may include another token "A=A+1." Though this token has the same literal, it forms a different content pattern. The deep learning network is trained to identify such unique content patterns in each process. This is further explained in detail in conjunction with FIG. 5 and FIG. 6.

Based on the identified content pattern, the scheduling device 102, at step 310, may assign a second tree ID to each of one or more processes from the plurality of processes. In an embodiment, for some of the plurality of processes, as a result of lack of information derived based on the associated set of attributes, the first tree ID may not have been determined. In such cases, once the content pattern within a process has been identified, the process is assigned a tree ID based on the content pattern. In another embodiment, for some of the plurality of processes, as a result of the content pattern identified at this step, the first tree ID may be replaced with a second tree ID.

Based on the second tree ID assigned to each of the one or more processes, the scheduling device 102, at step 312, generates a set of clusters for the plurality of processes. To this end, frequency and associativity of the second tree IDs may be determined. For the second tree IDs, the frequency may be determined based on the past arrival. Frequency count may be of two types. In the first scenario, when the deep learning network is not trained with incoming operations within processes, a process queue may be monitored to detect a recurrent set of operations stored in the queue. Thus, based on the arrival and frequency of an operation, the deep learning network may select parameters for training for that operation. In the second scenario, if the deep learning network is already trained for an operation, the dataset may need to retrain again for more accuracy in the deep learning network. In an embodiment, the frequency of the similar dataset referring to content pattern of the process may be captured and may be stored in a temporary memory. This may further be used for training the deep learning network.

For the second tree IDs, associativity may also be determined based on the bond between two or more trees. Based on the associativity, the tree statistics may be mentioned and this may be used with a plurality of combinations of one or more operations that are connected or appended with other operations. The associativity may also enable connecting different types of appended operations to a main operation in order to be learned and tracked. The deep learning network may develop associativity and generate clusters to enable identification of a main operation and appended operation. If the deep learning network determines that distance is very high between two operations, the deep learning network may not train for these operation datatypes. These operation datatypes are then left in the process queue. In contrast, when the operations have less distance, the deep learning network learns to detect these operations. Later the associativity can be determined based on the operation within that same cluster. In an embodiment, support score for the associativity may be close to 80% and confidence score may be above 90%. Based on the support score, the operations are fed into the next layer of the deep learning network for execution.

Thereafter, process scheduling patterns are matched based on the content patterns and the scheduling patterns that are variable are extracted. To this end, processes that are selected for execution are stored in a separate part of the memory 110 and processes are extracted along with their associated variables. Generic processes may include passing standard variables from operators and storing these temporarily. This enables the process work function to get reduced. Additionally, parallel to this, multiple process pattern matching may operate.

Operation variables are exchanged with operation in the Arithmetic Logic Unit (ALU), whereas the ALU may receive static operators from the cognitive processor 210. Based on the processes predicted by the cognitive processor 210, datasets may be required to be filled with exchanged variables that are stored in the memory 110. A tree ID may be used to identify a process that needs to be executed and the cluster name may be used to identify a processor that needs to execute the process. Additionally, these details may also be used to determine a cluster for which, the deep learning network needs to train on content patterns of a particular process. A tree ID may also relate to blocks, which may be data blocks that are further stored in memory blocks. If a process has multiple blocks, then block name for these set of tree IDs may change, while keeping the tree ID same. A clustering table 416 is illustrated in the exemplary embodiment of FIG. 4B. The clustering table 416 includes a tree ID column 418, a blocks column 420, a cluster name column 422, a chunk size column 424, and sequence ID column 426. It will be apparent from the clustering table 416 that processes with tree IDs ISD-5673, ISD-8743, ISD-5523 are categorized under the same cluster, i.e., CLS763.

Cluster names helps to train the deep learning network to categorize a content pattern of a process into a defined cluster. The content pattern may be new and may have never occurred before in previous processes. In such cases, the cluster name will be named as "other," until the volume of similar kind of content patterns crosses a predefined threshold. With regards to chunk size, it may depend on a storage unit used. For example, a storage unit may break data into 4 Kilobyte (KB) or a multiple thereof, based on the design of the operating system. The datasets are used in operation of the process, for which results are stored in a temporary memory. The execution of processes has to be sequential and results of executing these processes may also be stored in a sequential manner. The tree ID locations may help in determining the pointer to send results to the respective operation function.

The cognitive processor 210 may track a process within a tree and may map a detected tree ID with tree IDs waiting in the memory 110 or a process queue. One of the tree IDs may match with the detected tree ID. In this case, a pointer may pass over the control into a main tree system. The cognitive processor 210 may also provide an end result of executing a process to a respective tree. The cognitive processor 210 may monitor execution of all current trees in a CPU and may map their tree IDs to tree IDs of trees that are waiting in the queue or execution. The part of a process, which has not been learnt by the deep learning network or not known to the system may follow the schedule policy 208 and may be assigned to the architecture independent scheduler 204, based on its decision.

Based on execution of a single process within the cluster, the scheduling device 102, at step 314, executes each process within a cluster from the set of clusters. At step 316, the scheduling device 102, reuses output of the process executed from the cluster to execute each of remaining processes within the cluster. In an embodiment, the time for executing one or more for processes may be estimated and the process sequence for execution in a queue may be provided to the OS specific scheduler 206 for execution. In an embodiment, predicted operation values may not match with required values. In this case, a huge error may occur and hence the deep learning network learns that error and retrain itself.

Re-training the deep learning network maintains accuracy and updates the cognitive processor 210 with regards to multiple types of associativity. The retraining process may be performed by matching the predicted content pattern with a requested content pattern. Literals within processes may be used to determine whether the predicted content pattern may be related to the requested pattern. If literals do not match, the requested content pattern may be selected for retraining the deep learning network. The retraining may performed with at least 20% weightage of similar content patterns, so that the weightage of the retraining set has an impact over the training and accuracy of the deep learning network. With single interpretation, an object may land or fuse with ambiguous dataset. Thus, datasets are pulled together for further analysis before training the deep learning network. Training the deep learning network for various errors increases the associativity and clustering accuracy of the deep learning network.

Further, the OS specific scheduler 206 may execute the scheduled processes using the schedule policy 208, based on a queue depth and throttle. In this step, for a relevant process, the queue depth and the throttle may enable understanding an execution cluster or group that the process belongs to. In an embodiment, a deadlock may be created for minimal core processor. To avoid this or to completely eliminate the deadlock, a time value may be used as a threshold. Alternatively, queue depth priority ° may also be imposed based on the cluster and its distance. A process that has a similar content patterns and/or a similar kind of operation may be marked as a single cluster. For example, if a process P1 is 80% similar to a process P3, then P3 may belong to the cluster of P1. This is used to combine most similar clusters, so that the computation required and exchange of variable as well as memory cleaning time gets reduced. This also reduces the BUS travel or communication time for the parameter to onboard from the ALU to a processing unit.

Processes that were most recent in the queue and an execution cluster are more likely to be the same, may be executed at the same go. Other processes may be allocated to the other core. This may be similar to parallel computation with four cores in a dual core processor. For every CPU, cores are defined by the kernel, which is further interpreted by the cognitive processor 210. If there are four core processor, three may be used for the content pattern based execution and one may be used for unknown matched processes. These mechanisms eliminate deadlocks and further makes operations much faster, thereby optimizing process scheduling mechanism of the operating system.

As an example of the embodiment give above, a virtual desk may integrate to reduce computation volume from a cloud system. Processes that needs to be performed in the cloud may include, but are not limited to storing, API interface call, database access, and other web services that are required to be handled by any kind of computing system. There may be regular or similar processes which operate for all these operations. Content patterns within the processes may be learned by the cognitive processor 210, which intakes all this information from the OS specific scheduler 206 and the architecture independent scheduler 204.

The cognitive processor 210 may learn content patterns which are similar for all the processes and may then predict a result of execution these processes. As a result, multiple processes may be served without actually being operated by the CPU in a server machine. This may be added as a server client model for communication. This may reduce the overall server load by up to 40% in terms of computation, which is very vital for cloud services. For example, there may be an image bank which is assigned to a virtual machine, based on an end user requirement. Most of the process associated with these image may be similar while operating in cloud. Thus, these similar set of processes may be identified by the cognitive processor 210 and may get executed in the CPU through the architecture independent scheduler 204.

By way of another example, an automation framework may require a lot of transactional datasets. Moreover, the number of similar processes with recurrent time appearance are high. Thus, there is a scope of using the cognitive processor 210 to considerably reduce the workload of the automation framework. The incoming datasets which are consumed by the automation framework may be fed into the cognitive processor 210. The cognitive processor 210 may learn content pattern within the processes and sequence of these processes. The cognitive processor 210 may further predict an output of the executed result, thereby reducing the computation requirements of the automation framework. For example, the automation based framework may include repetitive tasks of same or multiple webpages which may be processed in a sequence. In this case, the cognitive processor 210 learns the sequence and executes the same through the architecture independent scheduler 204.

By way of yet another example, a cloud service platform may need to handle multiple user sessions and other cloud based analytics. This may also be a part of an orchestrator which may help to automate different processes that makes the user analyze cloud usage and other Key Performance Indicators (KPI) based parameters. These may be different types of transactional datasets, which execute almost similar processes. Thus, the cognitive processor 210 may learn similar content patterns from the processes that need to be executed in the CPU, in order to identify one or more processes which may be further settled by the itself, rather than processing the same operation every time. Thus a cost effective solution is provided that may improve CPU capabilities.

Figure 5:
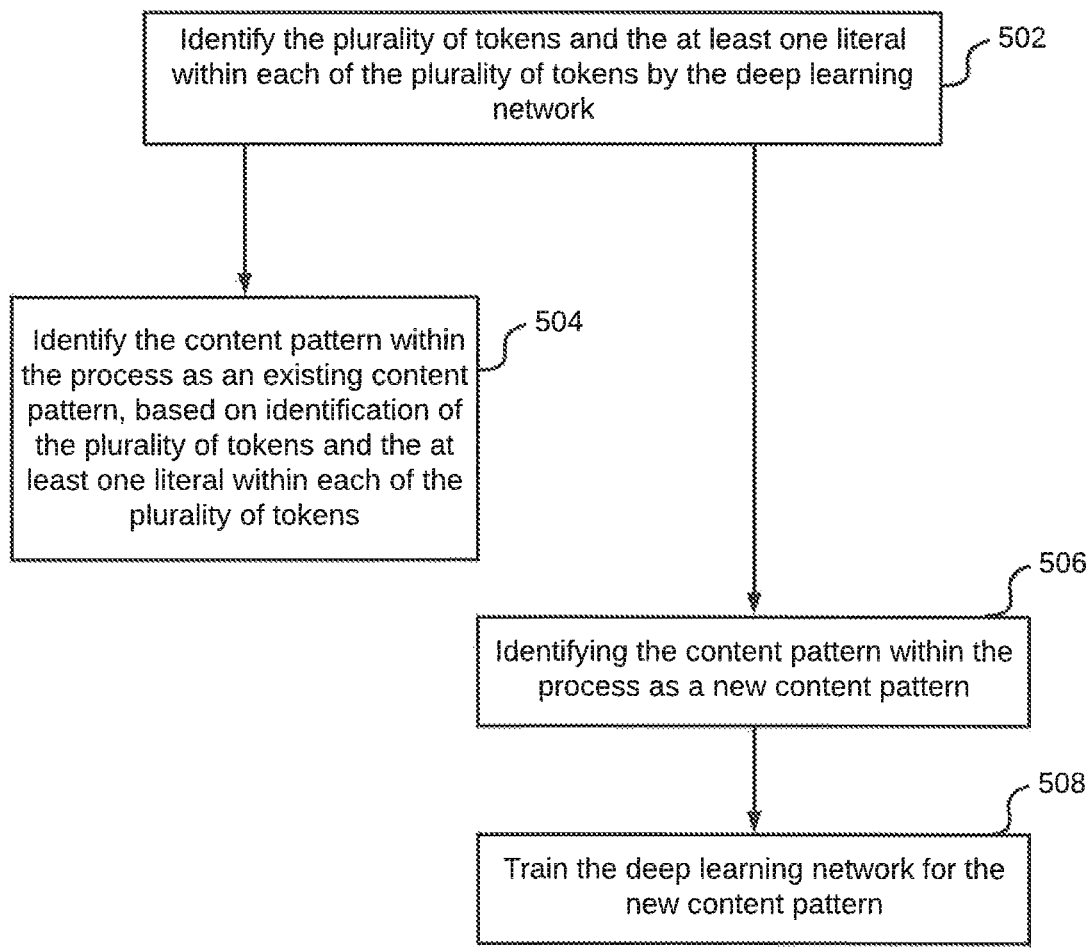
FIG. 5 illustrates a flowchart of a method for determining content pattern associated with each of the plurality of processes using a deep learning network, in accordance with an embodiment.

Referring now to FIG. 5, a flowchart of a method for determining content pattern associated with each of a plurality of processes using a deep learning network is illustrated, in accordance with an embodiment. The deep learning network, for example, may be an LSTM. At step 502, a plurality of tokens within a process are identified by the deep learning network. Additionally, at step 502, one or more literals within each of the plurality of tokens may be identified by the deep learning network. By way of an example, a token within a process may be "A+B," where "+" is a literal. In a similar manner, the process may include the following literals "x," "–," or "/," such that, each literal may be associated with a token. The process may be divided into multiple tokens. The step 502 may be followed either by step 504 or by step 506.

Based on the identification of the plurality of tokens and the one or more literals within each of the plurality of tokens, at step 504, a content pattern within the process may be identified as an existing content pattern by the deep learning network. By way of an example, multiple content patterns represented by different tokens for the same literal "+" may include A+B, A=A−1, and A=A++. If the deep learning network has been trained for each of these content patterns, when the deep learning network detects a similar content pattern in a process, the deep learning network the similar content pattern may be identified as an existing content pattern. Thereafter, a second tree ID may be assigned to the process based on the identified content pattern.

In an alternate embodiment, based on identification of the plurality of tokens and the one or more literals within each of the plurality of tokens, the deep learning network may identify the content pattern within the process as a new content pattern at step 506. The deep learning network may not be trained for the new content pattern. At step 508, the deep learning network may be trained for the new content pattern. In continuation of the example given above, the process may include "A+++" as a token. Since the deep learning network had been trained only on the following content patterns: A+B, A=A+1, and A=A++, the deep learning network identifies "A+++" as a new content pattern, irrespective of the new content pattern using the same literal "+."

Thus, once content patterns for two or more processes have been determined by the deep learning network, hierarchy for these two or more processes may be determined and associated trees for these two or more processes may be restructured and reorganized by assigning new or second tree IDS. This has already been explained in detail in conjunction with FIG. 3.

Figure 6:
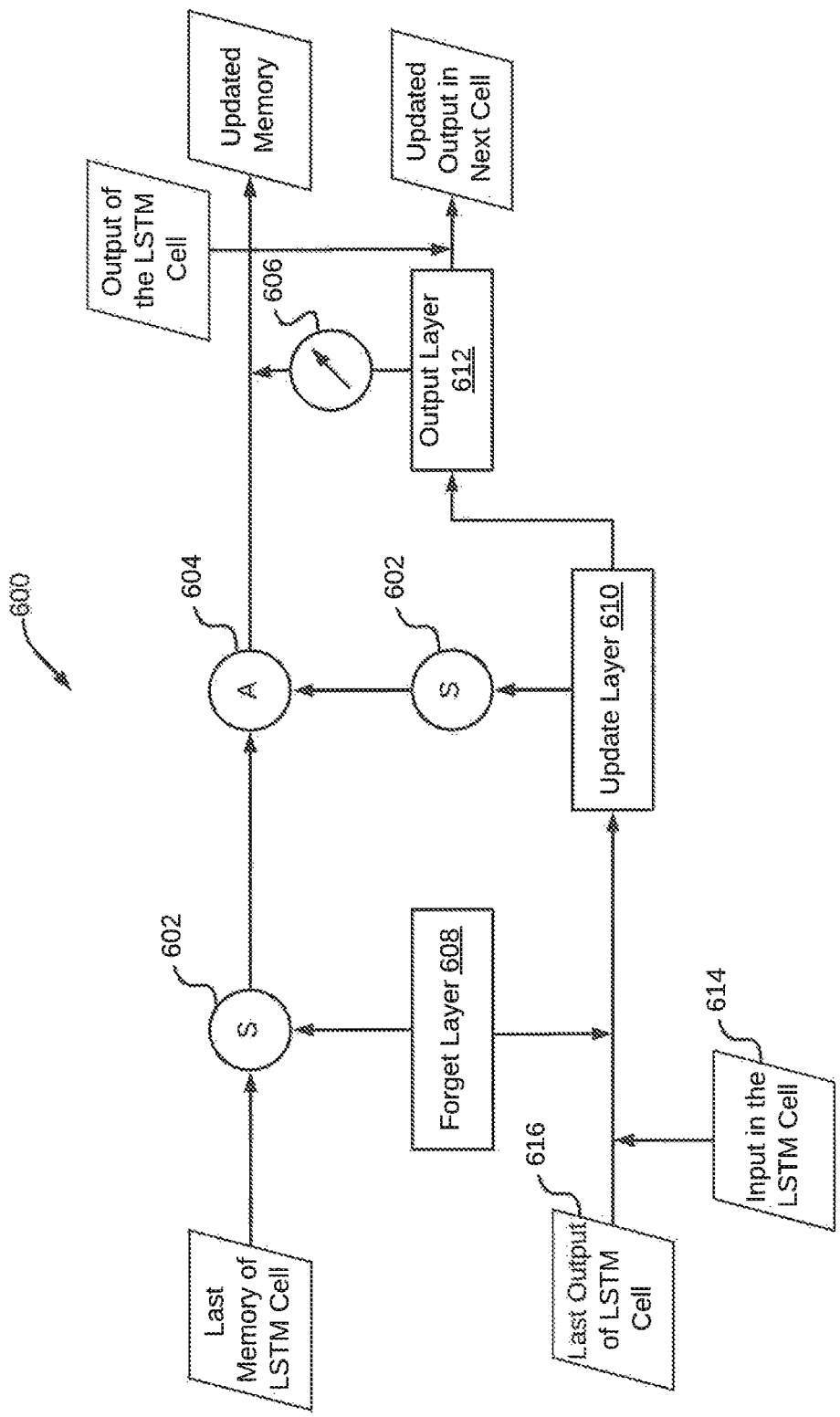
FIG. 6 illustrates a Long Short Term Memory (LSTM) trained to determine content pattern associated with processes, in accordance with an exemplary embodiment.

Referring now to FIG. 6, an LSTM 600 trained to determine content pattern associated with a processes is illustrated, in accordance with an exemplary embodiment. The LSTM 600 includes two scalar function 602, an addition function 604, and an activation function 606. The scalar functions 602 may multiply information or sequence of chunks with next sequence of the data. The addition function 604 adds information or appends the information along with the previous one. The activation function 606 activates neurons based on mathematical expressions. The activation function 606, for example, may be tan-h. The range of the tan-h activation function is between [−1, 1]. This increases flexibility in getting more accuracy from the system 100. More amount of sequences may lead to an increment in the number of neurons.

The datasets referring to content patterns within processes may be added in the LSTM 600. The input neurons may consume different functions pattern, such as, content patterns. By way of an example, this may be represented by equation 1 given below:

$$Add = reg(a) + reg(b), loc\_reg(a) + loc\_reg(b) \qquad (1)$$

The increment may be another set of training inputs. These datasets referring to the content patterns within processes are detected based on the number of frequency waiting in the queue as well past history of occurrences. The LSTM 600 may also consume previous occurrence of the functions in the sub occurrence. The LSTM 600 includes three layers of filtration and training, i.e., a forget layer 608, an update layer 610, and an output layer 612. The input dataset referring to the content patterns of the process is fed into an LSTM cell at 614. A required chunks are only allowed to be taken as an input and further the input from the past chunks are also taken into the cell at 616. Then in the output layer 612, a weight and input along with bias as well as activation is computed in the LSTM 600 for learning. A learning checkpoint is stored in the cognitive processor 210 for further prediction. In other words, further prediction may be carried out using this learning checkpoint. The learning checkpoint may also be updated with new set of training data. An error may also be added into the training dataset and the LSTM 600 may further be trained. In an embodiment, dataset of a specific process may be provided with its tree ID, which may be matched when the LSTM 600 makes the prediction. The LSTM 600 may also auto-annotate the process, which may be used to train the LSTM 600 again in order to achieve a new variant of the cluster set. Referring back to FIG. 4A, the tree ID table 408 illustrates processes that are labelled with tree ID based on content patterns within the data, as detected and determined by the LSTM 600.

Figure 7:
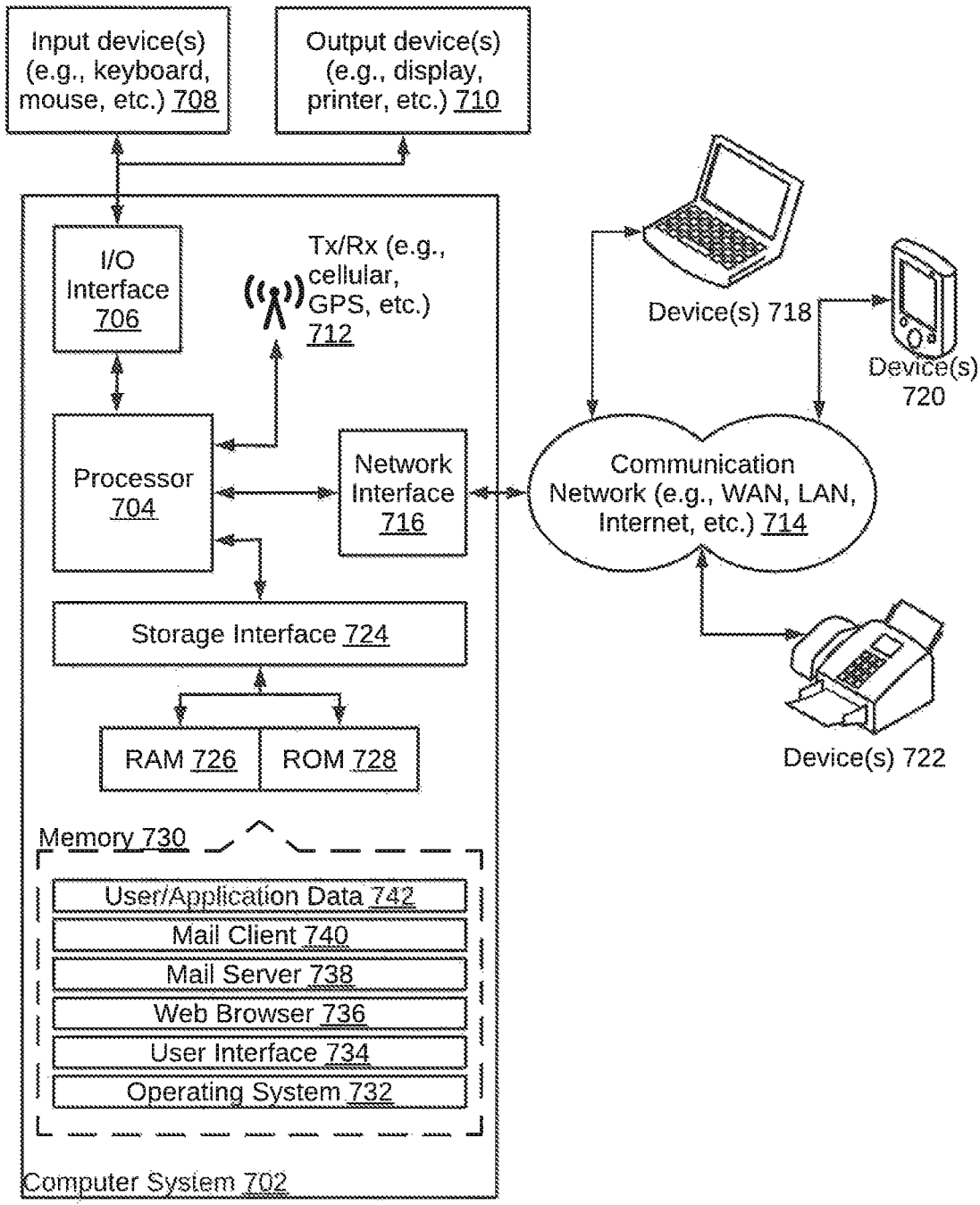
FIG. 7 illustrates a block diagram of an exemplary computer system for implementing various embodiments.

FIG. 7 is a block diagram of an exemplary computer system 702 for implementing various embodiments. Computer system 702 may include a central processing unit ("CPU" or "processor") 704. Processor 704 may include at least one data processor for executing program components for executing user- or system-generated requests. A user may include a person, a person using a device such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution 2(LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/ source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPNHSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices 718, 720, and 722 may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices 718, 720, and 722.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces 734 may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language. JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 736 may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for executing processes in operating systems. The proposed method automatically understands and identifies relevant content processes irrespective of any common process or application specific process. Further, the proposed method operates multiple process at the same time in the CPU cores, whereas the current state of the art solutions operate as a sequential process operation. This results in reducing storage complexity, as many times new space in the memory is not required to be initialized. The proposed method also reduces the time complexity in stacks, queue and buffer time. It is compatible with existing scheduling policy architectures and no major changes are required in implementation. Also, the proposed method makes all the cores in sync while processing operations. This solution may be integrated with Internet of Things (IoT) devices directly or indirectly, via cloud.

The specification has described method and system for executing processes in operating systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for executing processes in an operating system, the method comprising:

assigning, by a scheduling device, a tag Identifier (ID) and a first tree ID to each of a plurality of processes based on associated at least one attribute;
determining, by the scheduling device, content pattern associated with each of the plurality of processes using a deep learning network;
assigning, by the scheduling device, a second tree ID to each of at least one process from the plurality of processes based on the identified content pattern;
generating, by the scheduling device, a set of clusters for the plurality of processes based on the second tree ID assigned to each of the at least one process; and
executing, by the scheduling device, each process within a cluster from the set of clusters based on execution of a single process within the cluster.

2. The method of claim 1, further comprising:
converting a plurality of user actions into the plurality of processes; and
storing the plurality of processes in response to the converting, wherein each of the plurality of processes is assigned a process ID.

3. The method of claim 2, wherein the tree ID is same as the tag ID for a process from the plurality of processes, wherein the process forms a node in a tree represented by the tree ID.

4. The method of claim 1, wherein the at least one attribute associated with a process from the plurality of processes comprises at least one of an ID of the process, a type associated with the process, or an application associated with the process.

5. The method of claim 1, wherein the deep learning network is a Long Term Short Memory (LSTM) Network, and wherein the LSTM network uses a tan-h activation function.

6. The method of claim 1, wherein each of the plurality of processes comprises a plurality of tokens, and each of the plurality of tokens comprises at least one literal.

7. The method of claim 6, wherein determining the content pattern associated with a process from the plurality of processes comprises identifying the plurality of tokens and the at least one literal within each of the plurality of tokens by the deep learning network.

8. The method of claim 7, further comprising identifying the content pattern within the process as an existing content pattern, based on identification of the plurality of tokens and the at least one literal within each of the plurality of tokens.

9. The method of claim 7, further comprising:
identifying the content pattern within the process as a new content pattern, based on identification of the plurality of tokens and the at least one literal within each of the plurality of tokens; and
training the deep learning network for the new content pattern.

10. The method of claim 1 further comprising reusing output of the process executed from the cluster to execute each of remaining processes within the cluster.

11. A system for executing processes in an operating system, the system comprising:
a processor; and
a memory communicatively coupled to the processor, wherein the memory stores processor instructions, which, on execution, causes the processor to:
assign a tag Identifier (ID) and a first tree ID to each of a plurality of processes based on associated at least one attribute;
determine content pattern associated with each of the plurality of processes using a deep learning network;
assign a second tree ID to each of at least one process from the plurality of processes based on the identified content pattern;
generate a set of clusters for the plurality of processes based on the second tree ID assigned to each of the at least one process; and
execute each process within a cluster from the set of clusters based on execution of a single process within the cluster.

12. The system of claim 11, wherein the processor instructions further cause the processor to:
convert plurality of user actions into the plurality of processes; and
store the plurality of processes in response to the converting, wherein each of the plurality of processes is assigned a process ID.

13. The system of claim 11, wherein the at least one attribute associated with a process from the plurality of processes comprises at least one of an ID of the process, a type associated with the process, or an application associated with the process.

14. The system of claim 11, wherein the deep learning network is a Long Term Short Memory (LSTM) Network, and wherein the LSTM network uses a tan-h activation function.

15. The system of claim 11, wherein each of the plurality of processes comprises a plurality of tokens, and each of the plurality of tokens comprises at least one literal.

16. The system of claim 15, wherein to determine the content pattern associated with a process from the plurality of processes, the processor instructions further cause the processor to identify the plurality of tokens and the at least one literal within each of the plurality of tokens by the deep learning network.

17. The system of claim 16, wherein the processor instructions further cause the processor to identify the content pattern within the process as an existing content pattern, based on identification of the plurality of tokens and the at least one literal within each of the plurality of tokens.

18. The system of claim 17, wherein the processor instructions further cause the processor to:
identify the content pattern within the process as a new content pattern, based on identification of the plurality of tokens and the at least one literal within each of the plurality of tokens; and
train the deep learning network for the new content pattern.

19. The system of claim 11, wherein the processor instructions further cause the processor to reuse output of the process executed from the cluster to execute each of remaining processes within the cluster.

20. A non-transitory computer-readable storage medium having stored thereon, a set of computer-executable instructions causing a computer comprising one or more processors to perform steps comprising:
assigning a tag Identifier (ID) and a first tree ID to each of a plurality of processes based on associated at least one attribute;
determining content pattern associated with each of the plurality of processes using a deep learning network;
assigning a second tree ID to each of at least one process from the plurality of processes based on the identified content pattern;
generating a set of clusters for the plurality of processes based on the second tree ID assigned to each of the at least one process; and executing each process within a cluster from the set of clusters based on execution of a single process within the cluster.

* * * * *